United States Patent
Stedt et al.

[11] Patent Number: 6,053,671
[45] Date of Patent: Apr. 25, 2000

[54] METAL CUTTING INSERT, AND TOOL THEREFOR, AND METHOD OF MOUNTING INSERT

[75] Inventors: Robert Stedt; Sven Eklund, both of Fagersta, Sweden; Bertrand Riviére, Bourges, France

[73] Assignee: Seco Tools AB, Fagersta, Sweden

[21] Appl. No.: 08/981,286

[22] PCT Filed: Jun. 18, 1996

[86] PCT No.: PCT/SE96/00784

§ 371 Date: Apr. 9, 1998

§ 102(e) Date: Apr. 9, 1998

[87] PCT Pub. No.: WO97/00750

PCT Pub. Date: Jan. 9, 1997

[30] Foreign Application Priority Data

Jun. 21, 1995 [SE] Sweden ................................ 9502254

[51] Int. Cl.[7] .................................................. B23C 5/20
[52] U.S. Cl. ............................ 407/35; 407/43; 407/47; 407/64
[58] Field of Search ................................ 407/113, 35, 34, 407/40, 43, 47, 48, 51, 53, 61, 62, 64

[56] References Cited

U.S. PATENT DOCUMENTS

| | | |
|---|---|---|
| 1,838,520 | 12/1931 | Archer . |
| 4,812,087 | 3/1989 | Stashko ...................................... 407/42 |
| 5,147,158 | 9/1992 | Rivere . |
| 5,236,288 | 8/1993 | Flueckiger ................................ 407/36 |
| 5,346,336 | 9/1994 | Rescigno . |
| 5,536,119 | 7/1996 | Werner et al. . |
| 5,827,016 | 10/1998 | Strand ...................................... 407/115 |
| 5,855,457 | 1/1999 | Arai et al. ................................ 407/40 |

FOREIGN PATENT DOCUMENTS

| | | |
|---|---|---|
| 0 300 172 | 1/1989 | European Pat. Off. . |
| 0 458 003 | 11/1991 | European Pat. Off. . |

*Primary Examiner*—Henry W. H. Tsai
*Attorney, Agent, or Firm*—Burns, Doane, Swecker & Mathis, L.L.P.

[57] ABSTRACT

A cutting tool, preferably for milling, includes a holder and a cutting insert mounted thereon. The holder includes a seat upon which the insert is mounted, and an upstanding wall structure against which an edge face of the insert is pressed. The edge face has upper and lower portions separated by a step. The upper portion is frustoconical and is pressed against an upper wall of the wall structure to frictionally resist rotation of the insert about the insert's center axis. The lower portion of the edge face is polygonal and is adapted to engage a lower wall of the wall structure at a location spaced radially inwardly from a location where the upper portion and upper wall make contact. The lower portion rotates into engagement with the lower wall in response to cutting forces acting on the insert, to create an interference relationship between the lower portion and lower wall which prevents further rotation of the insert.

4 Claims, 4 Drawing Sheets

6,053,671

METAL CUTTING INSERT, AND TOOL THEREFOR, AND METHOD OF MOUNTING INSERT

BACKGROUND OF THE INVENTION

The present invention relates to a cutting tool for chip forming machining preferably for milling, comprising a holder and a cutting insert, said cutting insert having a generally circular basic shape and including at least one cutting edge created by the transition between an upper face and an edge face of the cutting insert, said upper face being a rake face and said edge face being a clearance face, said holder and cutting insert having first means for preventing rotation of the insert about a center axis. The invention further relates to a cutting insert and a method for preventing rotation of a cutting insert.

In tools for metal cutting having indexable cutting inserts of hard and wear resistant material the cutting edges are subjected to wear and sometimes some part of or the entire cutting edge collapses. If a small insert fractures, only the cutting edge collapses without any risk for damage to the tool body. If a large insert fractures, the risk of damage to the tool body increases to an essential degree. If the cutting insert has no shim, an insert fracture often gives rise to damages of the tool body. In order to avoid such damages it is usual that the cutting insert rests on a shim of cemented carbide. A usual combination is a cutting insert having a thickness of about 5 mm and a shim having a thickness of 3–5 mm. This results in a total thickness of the cutting insert and the shim of 8–10 mm.

Riviére U.S. Pat. No. 5,147,158 discloses a polygonal cutting insert having an integrated shim so as to provide a fracture zone.

Rescigno U.S. Pat. No. 5,346,336 shows a circular metal cutting insert provided with five equidistant flat facets on the clearance surface. The facets are provided to constitute defined positions when indexing the cutting insert. Each facet forms an acute angle relative to the central axis of the cutting insert. A retention screw secures the insert to the insert seat of a holder. In the known tool, friction is not a major contributor against unwanted rotation of the insert. The locating surfaces of the insert will be worn such that the position of the insert in the seat will be increasingly less accurate during use. Furthermore the known insert lacks fracture zones so as to prevent an insert breakage from transferring into the seat or shim.

OBJECTS OF THE INVENTION

One object of the present invention is to present a cutting insert that overcomes the disadvantages discussed above.

Another object of the present invention is to provide a cutting insert, a cutting tool and a method including means adapted for a double retention against rotation of the insert.

Still another object of the present invention is to provide a cutting insert having an integrated shim performing three different functions, namely fracture, rotational and indexing control.

SUMMARY OF THE INVENTION

These and other objects are realized by a cutting insert for chip forming machining. The insert comprises a body having a generally circular upper face, a lower face, and an edge face interconnecting the upper and lower faces. A transition between the upper face and the edge face forms a cutting edge. The edge face includes upper and lower portions separated by a step whereby a perpendicular distance from a center axis of the body to the edge face is greater above the step than below the step. The upper portion is generally frustoconical and tapers in a downward direction. The lower portion is disposed closer to the lower face than to the upper face and is spaced radially inwardly of a downward projection of the generally frustoconical upper portion. A first height extending from the lower face to an intersection of the step with the lower portion is from 15–60% of a second height extending from the lower face to the cutting edge.

Preferably, a perpendicular distance from the center axis to the lower portion of the edge face is nonuniform around the perimeter of the lower portion.

The invention also relates to the combination of a cutting tool and a cutting insert, and to a method of fixing a cutting insert against rotation about its center axis.

BRIEF DESCRIPTION OF THE DRAWINGS

An embodiment of the cutting tool according to the present invention is described below, reference being made to the accompanying drawings wherein.

DETAILED DESCRIPTION OF A PREFERRED EMBODIMENT OF THE INVENTION

Figure 1:
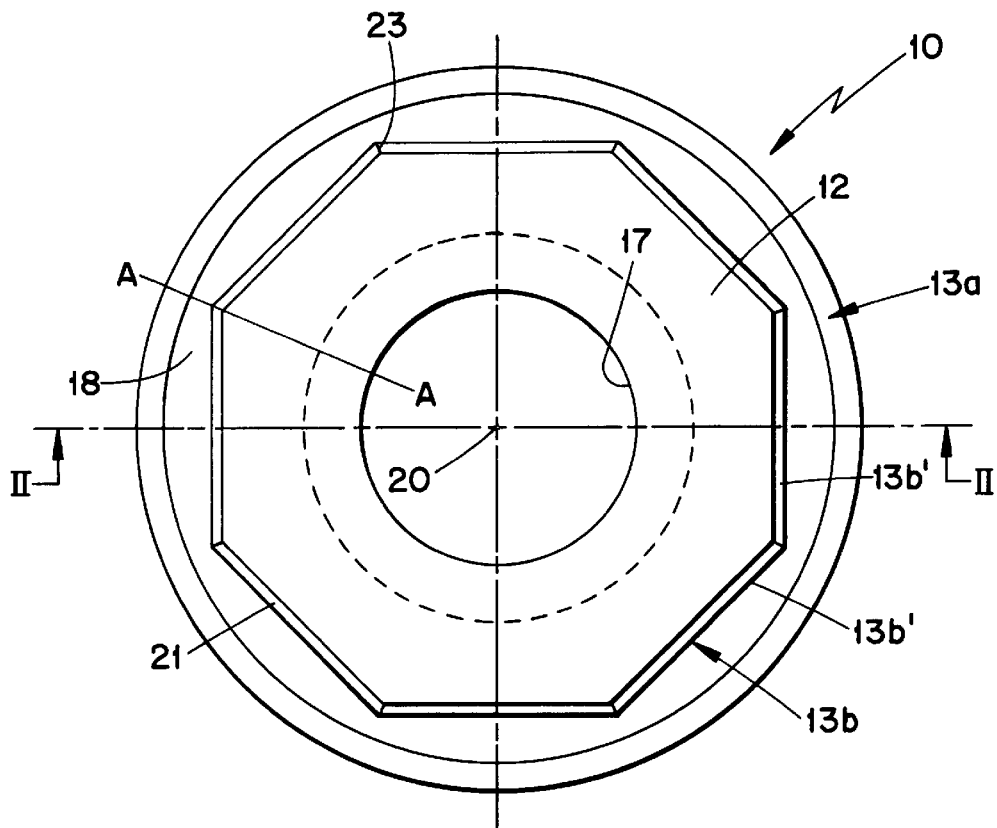
FIG. 1 shows a bottom view of the cutting insert according to the present invention.
Figure 2:
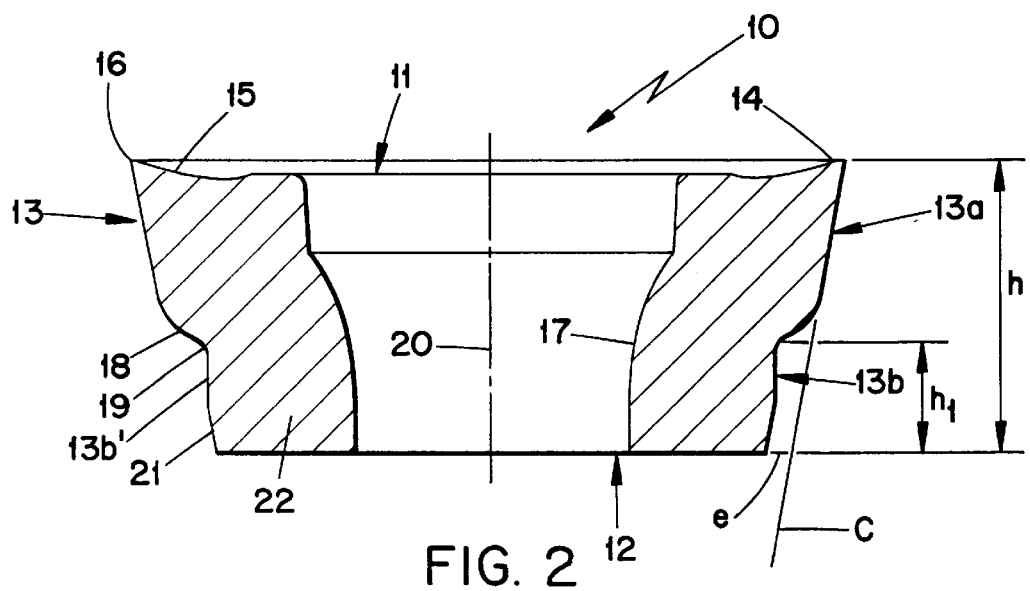
FIG. 2 shows a section along II—II in FIG. 1.

The cutting insert 10 in FIGS. 1 and 2 has a generally circular basic shape and includes an upper face 11, a lower face 12 and an edge face 13 generally connecting the upper and lower faces 11, 12 respectively. The cutting insert 10 has a positive geometry, i.e. the edge surface 13 forms an acute angle with the upper face 11. The upper face 11 is a rake face and the edge face 13 is a clearance face. The upper face 11 includes a circular chip upsetting face 14 located at the periphery of the cutting insert 10. Further the upper face 11 includes a chip face 15 sloping inwardly and downwardly from the circular chip upsetting face 14. Alternatively, the upper face may have other shapes such as a planar shape. The faces 14 and 15 constitute the most peripheral part of the upper face 11. The intersecting line between the chip upsetting face 14 and the edge face 13 forms the circular cutting edge 16. The edge surface 13 coincides with a part of an imaginary cone C. The apex of the cone intersects the center line 20 of the cutting insert 10 below the lower face 12.

In the disclosed embodiment the cutting insert 10 is provided with a through hole 17 intended to receive a clamping screw (not shown) that secures the cutting insert 10 to the tool holder.

The edge surface 13 is provided with a step 18. A first portion 13a of the edge surface 13 that is located above the step 18 has a positive geometry in order to provide the necessary clearance angle of the tool while a second portion 13b of the edge surface 13 has a negative geometry, i.e. the second portion 13b is perpendicular to the lower surface 12 and has a clearance angle of 0°. The second portion 13b of the edge surface 13 is disposed radially inwardly of the above-mentioned imaginary cone. That is, the portion 13b of the edge surface does not need to be ground if the clearance face (i.e., portion 13a) is ground and thereby it saves energy. Furthermore the step 18 will then be sufficiently large in the radial direction to provide for a favorable control of any cracks emanating during machining.

The step 18 provides a sharp inner corner 19 that defines a fracture zone and in the event of a possible break of the cutting edge, controls the break and leaves the lower portion of the cutting insert undamaged. The second or lower portion 13b thus protects the tool body.

Concerning the measures shown in FIG. 2 the following is to be said. The height $h_1$ from the lower face 12 to the point where the step 18 intersects the lower portion 13b is 15–60% of the height h from the lower face 12 to the cutting edge 16, preferably about 25%. This is possible since the "shim" constitutes an integral part of the cutting insert 10, i.e. the height $h_1$ corresponds to the height of an integrated shim 22. In order to achieve a good function of the cutting insert 10 it is necessary that the height $h_1$ does not constitute too big a part of the height h since in that case the strength of the cutting edge would be low and could result in fractures of the cutting edge also at small loads. The radial distance e from the step 18 to the cone C in the plane of the lower face 12 depends on the clearance angle. The distance e in the cross section II—II, is in the interval 0.2–2.5 mm, preferably in the interval 0.2–1.5 mm. A preferred value of e is in the magnitude of 0.5 mm. The distance e in another cross section according to line A—A in FIG. 1, is in the interval 0.1–1.5 mm, preferably in the interval 0.2–1.0 mm. The entire second portion 13b, however, is spaced from the imaginary cone C to provide for breakage control all around the insert.

The second portion 13b further connects to a bevel portion 21 to facilitate the entry of the insert into a pocket of a holder, described in detail below. The second portion 13b comprises a number of segments 13b' formed at the periphery of the shim 22. There can be provided 5–12 such segments on the shim, preferably 7–9 segments. A preferred value is 8 segments. In the latter case two diametrically opposed segments 13b' are parallel, as can be seen in FIG. 1. Two adjacent segments 13b' meet in a corner 23 at an internal obtuse angle, about 135°. When the insert is mounted in a holder, the corners 23 will prevent undesired rotation of the insert. It is therefore important that the corners project radially outwardly relative to the remaining portions of the segments 13b'. Said rest of the segments 13b' shall participate in the proper positioning of the insert but shall participate in preventing the insert from rotation only when the cutting forces exceed the frictional force. The periphery of the lower part 13b describes a path of increasing and decreasing distance from the center axis of the insert. The second portion 13b may, for example, be of star-shaped form or similar, as long as the corners project radially outwardly beyond the portions of the segments 13b' disposed between the corners.

Figure 3:
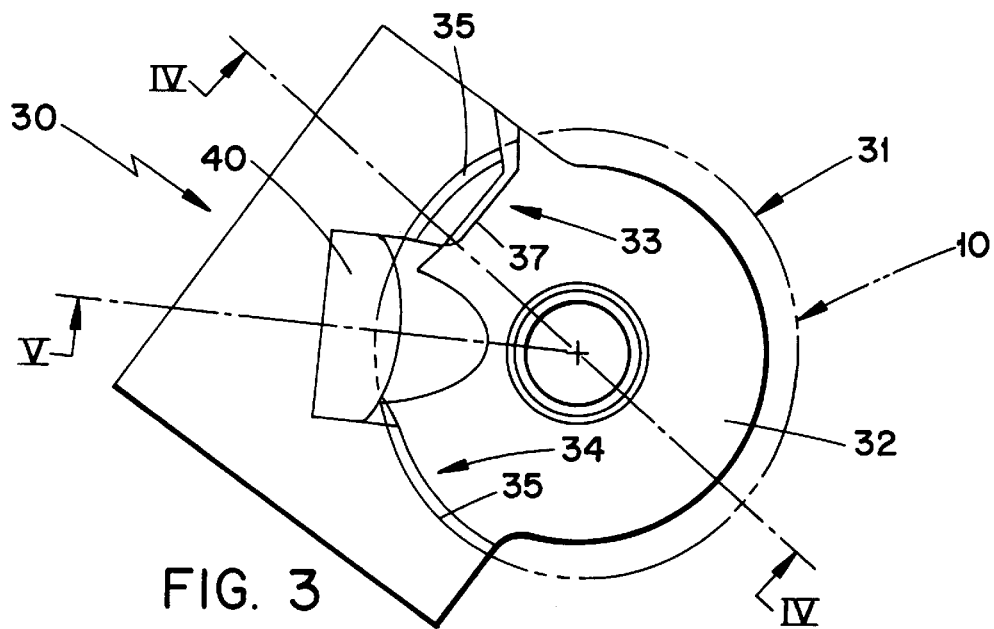
FIG. 3 shows an insert site in a cutter body according to the present invention in a top view.
Figure 4:
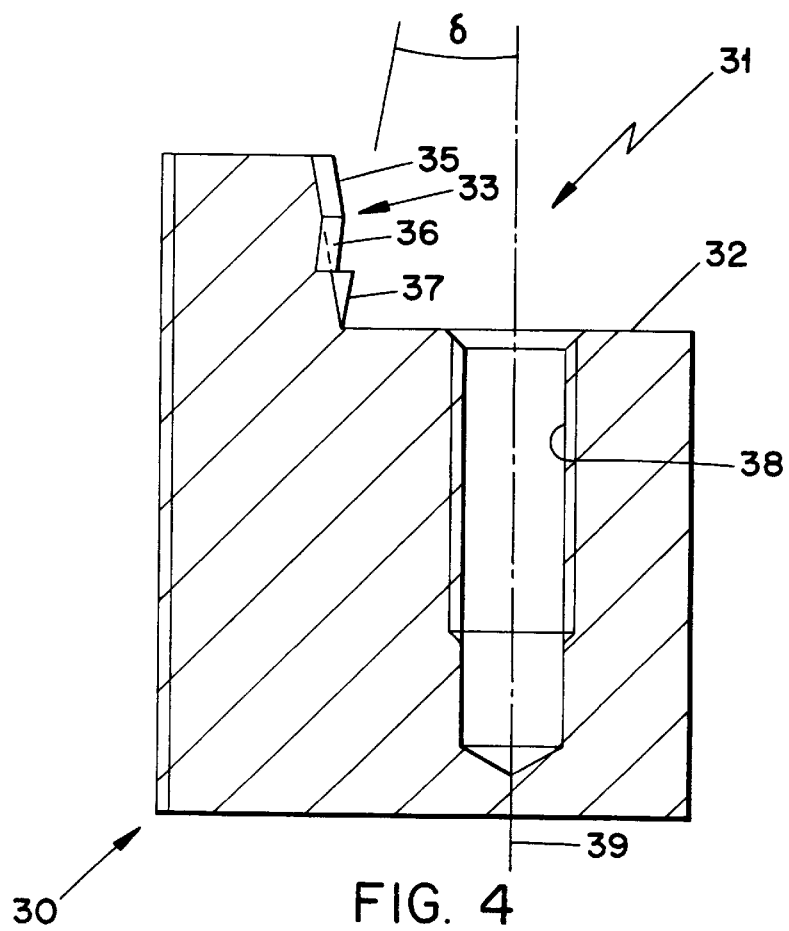
FIG. 4 shows a cross section along IV—IV in FIG. 3.
Figure 5:
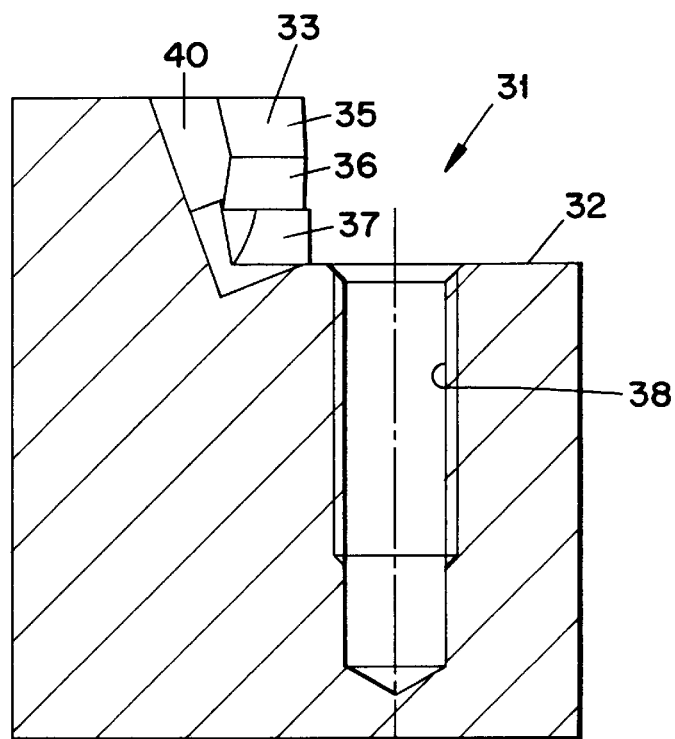
FIG. 5 shows a cross section along V—V in FIG. 3.

Turning now to FIGS. 3, 4 and 5 a tool holder 30 is shown. The holder 30 is a milling cutter body which has a number of pockets 31 for receiving cutting inserts. Each pocket comprises a substantially planar base 32 and upstanding shoulders 33, 34. Each shoulder includes an upper concave surface 35, provided to abut the first portion 13a of the insert, and an undercut portion 36. The surfaces 35 are provided to coincide with the previously discussed cone C. At least one shoulder 33 has a lower portion 37, provided to abut a corner 23 of the shim 22. A threaded boring 38 is provided close to but not in the center of the base 32, so that a fastening screw in a known manner will force the insert towards the shoulder and the base. The boring has a center axis 39 which is substantially perpendicular to the base 32. The lower portion 37 is preferably straight and lies in a plane forming an acute angle δ with the center line 39 in a direction upwards from the base, as seen in FIG. 4. This is to secure a distinct position for the point or line of contact between the corner 23 and the portion 37. The shoulders 33, 34 may be interrupted by a slot 40. The function of the slot is to make the surfaces 35 of the shoulders less sensitive to tolerance faults during manufacturing thereof.

Figure 6:
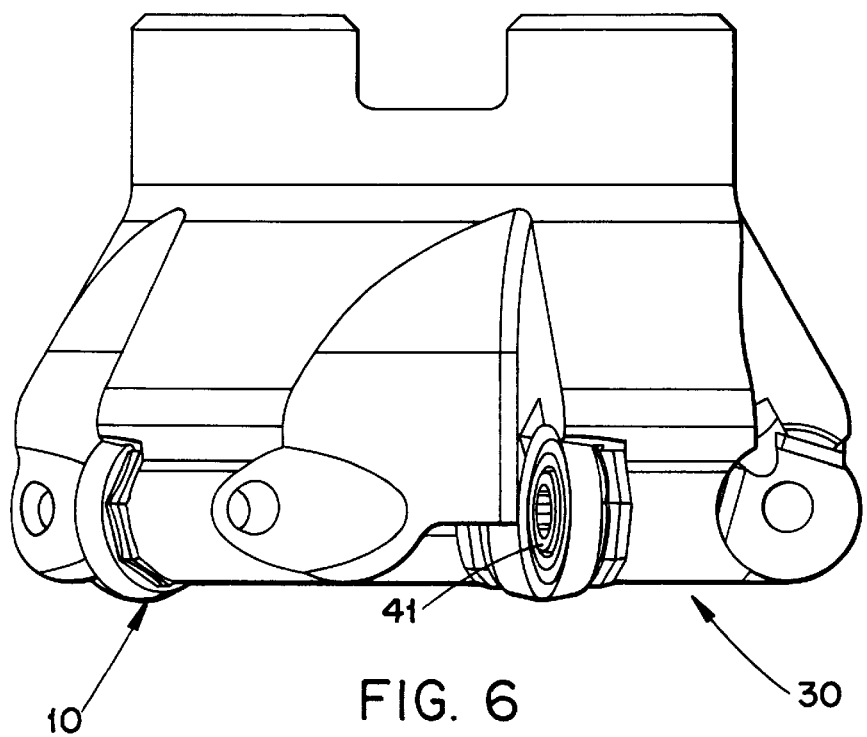
FIG. 6 shows a milling cutter according to the present invention in a side view.
Figure 7:
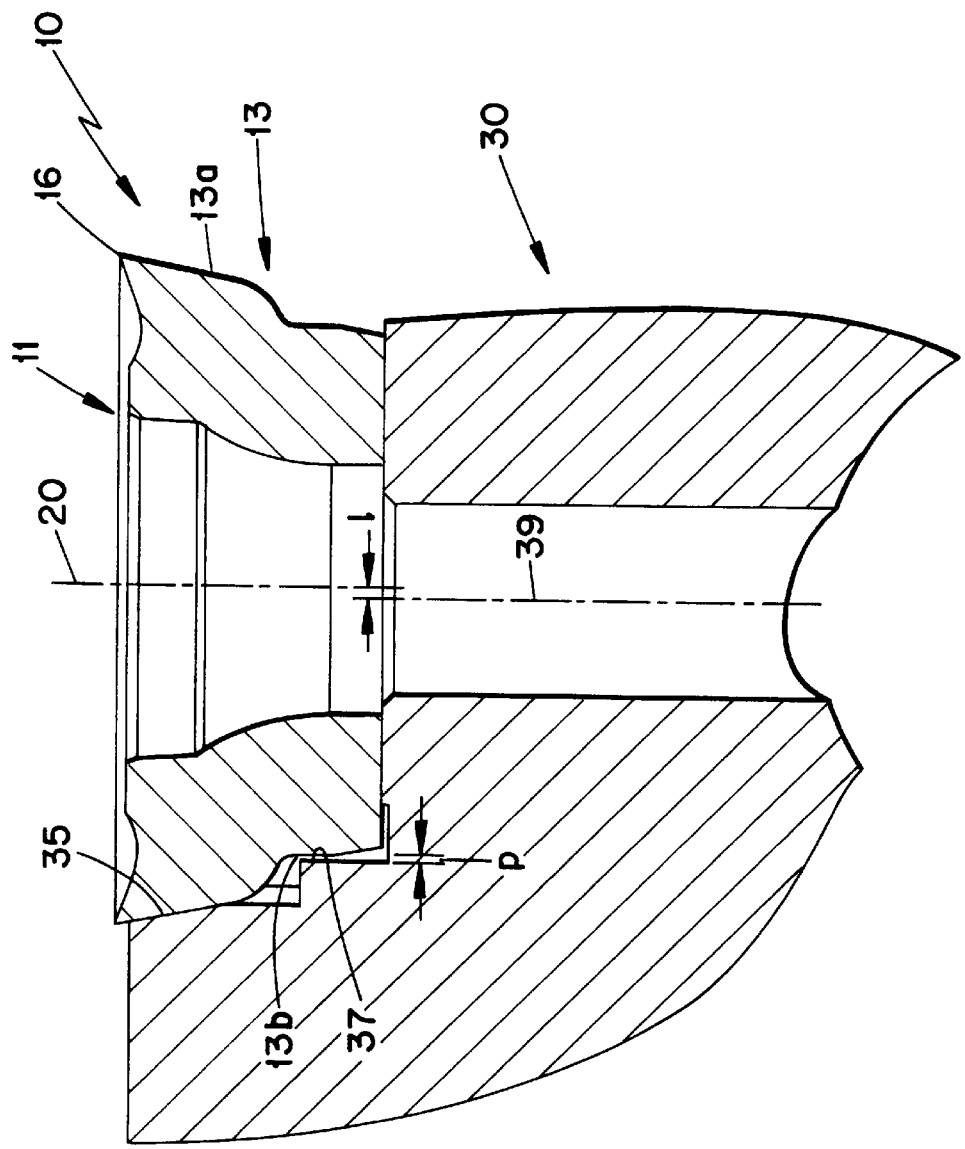
FIG. 7 shows a cross section through the cutter in FIG. 6.

In FIGS. 6 and 7, the cutting tool is assembled and especially from FIG. 7 it is apparent how the cutting insert 10 and the holder 30 cooperate. The insert is placed in the pocket 31 with one of its segments 13b' facing towards the lower portion 37. Then the lower face 12 abuts the base 32. A screw 41 is inserted through the hole 17 of the insert and threaded into the bore 38 of the holder and tightened. Since the axis 20 of the insert is radially displaced relative to the axis 39 of the boring 38 a distance 1 in direction away from the shoulders 33, 34 the screw will cam the insert towards the shoulders and towards the base. When the screw has been tightened the clearance face 13a of the insert will exert a pressure against the upper concave surfaces 35. The friction caused thereby is in most cases sufficient to secure the insert from rotation during milling. Another means 37, 13b for preventing rotation of the insert comprises at least two possible positions, a first position (not shown) wherein no gap p is arranged between the segment 13b' of the insert and the first wall 37, and a second position wherein a gap p is formed, e.g., about 0.1–0.3 mm. However, even if a gap p is present, when the cutting forces exceed the frictional acting between the face 13a and surface 35, the insert will rotate until the corner 23 abuts the lower portion 37 of the shoulder 33. Then the insert is prevented from further rotation. When the insert is to be changed for a new insert the abovementioned procedure is reversed.

When the insert is to be indexed the screw 41 is partially unscrewed until the lower face 12 can be lifted above the lower portion 37 and the insert may be rotated a step corresponding to 35° when having eight positions (i.e., 8 segments 13b') at the shim. Then the screw is tightened again.

Although the described embodiment of the invention refers to a milling cutter the invention is also applicable on turning tools using a round insert.

The invention is in no way restricted to the embodiment described above but can be varied freely within the scope of the appended claims.

We claim:

1. A cutting tool for chip forming machining comprising a holder and a cutting insert:

the holder comprising a base on which the insert is seated, and an upstanding wall structure against which the insert is pressed, the wall structure comprising first and second walls, the first wall disposed below the second wall;

the insert comprising a body having a generally circular upper face, a lower face seated on the base, and an edge face interconnecting the upper and lower faces; a transition between the upper face and edge face forming a continuous circular cutting edge; the edge face including upper and lower portions, the upper portion of the edge face being frustoconical and converging toward the base; a perpendicular distance from a center axis of the body to the lower portion of the edge face being non-uniform around the perimeter of the lower portion; the entire lower portion of the edge face being spaced radially inwardly from a downward projection of the frustoconical upper portion, whereby a step is formed between the upper and lower portions; the upper portion engaging the second wall at a first location for frictionally resisting rotation of the insert about the center axis; the lower portion being engageable with the first wall at a second location spaced below and radially inwardly of the first location with reference to the center axis, for resisting rotation of the insert about the center axis, wherein a portion of the edge face located between the upper and lower portions is spaced from the upstanding wall structure to be out of contact therewith.

2. The cutting tool according to claim 1 wherein a first height extending from the lower face to an intersection of the step with the lower portion being from 15–60% of a second height extending from the lower face to the cutting edge.

3. The cutting tool according to claim 1 wherein the lower portion of the edge face has a polygonally shaped perimeter.

4. The cutting tool according to claim 1 wherein the base includes a threaded bore, and the insert includes a center hole; the cutting tool further including a screw passing through the center hole and threaded in the bore; a center axis of the center hole being offset from a center axis of the threaded bore in a direction away from the upstanding wall structure, whereby the screw forces the insert radially toward the upstanding wall structure.

* * * * *